United States Patent
Kavanaugh

(10) Patent No.: US 9,265,240 B2
(45) Date of Patent: *Feb. 23, 2016

(54) FISHING DEVICE INSERTS

(71) Applicant: Patrick John Kavanaugh, Eau Claire, WI (US)

(72) Inventor: Patrick John Kavanaugh, Eau Claire, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 14/287,420

(22) Filed: May 27, 2014

(65) Prior Publication Data

US 2014/0259865 A1   Sep. 18, 2014

Related U.S. Application Data

(63) Continuation-in-part of application No. 13/686,386, filed on Nov. 27, 2012, now Pat. No. 8,769,864, which is a continuation of application No. 13/009,061, filed on Jan. 19, 2011, now Pat. No. 8,341,871.

(51) Int. Cl.
*A01K 91/04* (2006.01)
*A01K 93/00* (2006.01)
*A01K 91/03* (2006.01)

(52) U.S. Cl.
CPC ............... *A01K 93/00* (2013.01); *A01K 91/03* (2013.01)

(58) Field of Classification Search
CPC ........ A01K 91/04; A01K 93/00; A01K 95/02
USPC ............... 43/42.49, 44.87, 43.1, 44.9, 44.92, 43/44.93, 44.91
See application file for complete search history.

(56) References Cited

U.S. PATENT DOCUMENTS

| | | | |
|---|---|---|---|
| 522,167 A | 6/1894 | Rawlings | |
| 668,254 A | 2/1901 | Dickinson | |
| 1,504,884 A | 8/1924 | Garst | |
| 2,315,048 A * | 3/1943 | Croft | 43/44.9 |
| 2,483,788 A * | 10/1949 | Robinson | 43/44.9 |
| 2,531,806 A | 11/1950 | Coughlin | |
| 2,570,293 A | 10/1951 | Vadnais | |
| 2,729,015 A | 1/1956 | Finnegan | |
| 2,778,147 A | 1/1957 | Peck, Jr. | |
| 2,829,464 A | 4/1958 | Pettit, Jr. et al. | |
| 2,827,752 A | 2/1959 | Salzmann | |
| 2,992,508 A | 7/1961 | Schmidt | |
| 3,019,546 A | 2/1962 | Hansen | |
| 3,056,229 A | 10/1962 | Haney | |

(Continued)

OTHER PUBLICATIONS

Prosecution documents from U.S. Appl. No. 13/686,386, filed Nov. 27, 2012, including Application filed Nov. 27, 2012 and Notice of Allowance mailed Feb. 25, 2014, 29 pages.

*Primary Examiner* — Christopher P Ellis
*Assistant Examiner* — Michael Wang
(74) *Attorney, Agent, or Firm* — Katherine M. Scholz; Kelly, Holt & Christenson, PLLC

(57) ABSTRACT

A fishing mechanism for selectively attaching a fishing device to a line is provided. In one example, the fishing mechanism comprises an elongated outer insert mechanism having a line path channel formed therein, the line path channel extending from one end of the elongated outer insert mechanism to its other end, and wherein the elongated outer insert mechanism further comprises an elongated opening that extends from said one to said other end, the elongated opening being configured such that the line may be placed through the elongated opening and into the line path channel without having to guide an end of the line through the line path channel from said one end to said other end.

18 Claims, 9 Drawing Sheets

(56) References Cited

U.S. PATENT DOCUMENTS

| | | | |
|---|---|---|---|
| 3,091,050 A * | 5/1963 | Metzler | 43/44.88 |
| 3,096,599 A * | 7/1963 | Baron | 43/44.9 |
| 3,224,132 A * | 12/1965 | Frantz | 43/17.2 |
| 3,273,278 A | 9/1966 | Lynch | |
| 3,733,734 A | 5/1973 | Hysaw | |
| 3,803,749 A | 4/1974 | Boyum | |
| 4,026,062 A | 5/1977 | Mosley et al. | |
| 4,361,978 A * | 12/1982 | Kane | 43/44.87 |
| 4,418,492 A * | 12/1983 | Rayburn | 43/44.9 |
| 4,458,439 A | 7/1984 | Garrett, Sr. | |
| 4,635,392 A | 1/1987 | Wirkus | |
| 4,656,777 A | 4/1987 | Fernbach | |
| 4,691,468 A * | 9/1987 | Fernbach | 43/44.9 |
| 4,696,125 A | 9/1987 | Rayburn | |
| 5,241,774 A * | 9/1993 | Rayburn | 43/44.9 |
| 5,305,534 A | 4/1994 | Lazich | |
| 5,377,444 A * | 1/1995 | Gibney, Sr. | 43/44.91 |
| D442,256 S * | 5/2001 | Haney | D22/146 |
| 6,732,470 B1 * | 5/2004 | Bennett | 43/44.9 |
| 7,162,830 B2 * | 1/2007 | Sims | 43/44.9 |
| 7,614,179 B2 | 11/2009 | Kavanaugh | |
| 7,805,881 B2 | 10/2010 | Kavanaugh | |
| 8,196,338 B2 | 6/2012 | Kavanaugh | |
| 8,341,871 B2 | 1/2013 | Kavanaugh | |

\* cited by examiner

FISHING DEVICE INSERTS

CROSS-REFERENCE TO RELATED APPLICATION

The present application is a continuation-in-part of and claims priority to U.S. patent application Ser. No. 13/686,386, filed Nov. 27, 2012, which claims priority to U.S. patent application Ser. No. 13/009,061, filed Jan. 19, 2011, the content of which is hereby incorporated by reference in its entirety.

BACKGROUND

Fishing bobbers are commonly connected to a fishing line when fishing. Bobbers can serve several functions. One possible function includes controlling the depth of the hook and bait. Another possible function includes providing a signaling mechanism for indicating when a fish is biting at the bait or when a fish has been hooked.

Two types of fishing bobbers include attachment bobbers and slip bobbers. Attachment bobbers are maintained at a fixed position on the fishing line. For instance, some attachment bobbers having a clipping mechanism that securely fastens the bobber to a particular location on the line. Slip bobbers on the other hand are not attached to one particular location along the line and are able to move at least some distance along the line. For instance, a slip bobber may be placed between a hook and a knot in a fishing line, and the slip bobber is able to move between the hook and the knot.

SUMMARY

A fishing mechanism for selectively attaching a fishing device to a line is provided. In one example, the fishing mechanism comprises an elongated outer insert mechanism having a line path channel formed therein, the line path channel extending from one end of the elongated outer insert mechanism to its other end, and wherein the elongated outer insert mechanism further comprises an elongated opening that extends from said one to said other end, the elongated opening being configured such that the line may be placed through the elongated opening and into the line path channel without having to guide an end of the line through the line path channel from said one end to said other end.

These and various other features and advantages that characterize the claimed embodiments will become apparent upon reading the following detailed description and upon reviewing the associated drawings.

DETAILED DESCRIPTION

Embodiments of the present disclosure include fishing bobbers. One particular example of a fishing bobber 100 is shown in FIGS. 1-6. It should be noted however that embodiments of the present disclosure are not limited to the specific example shown in the figures. Embodiments of the present disclosure illustratively include fishing bobbers having any one or more features or combination of features described in this specification and/or shown in the figures.

Figure 1:
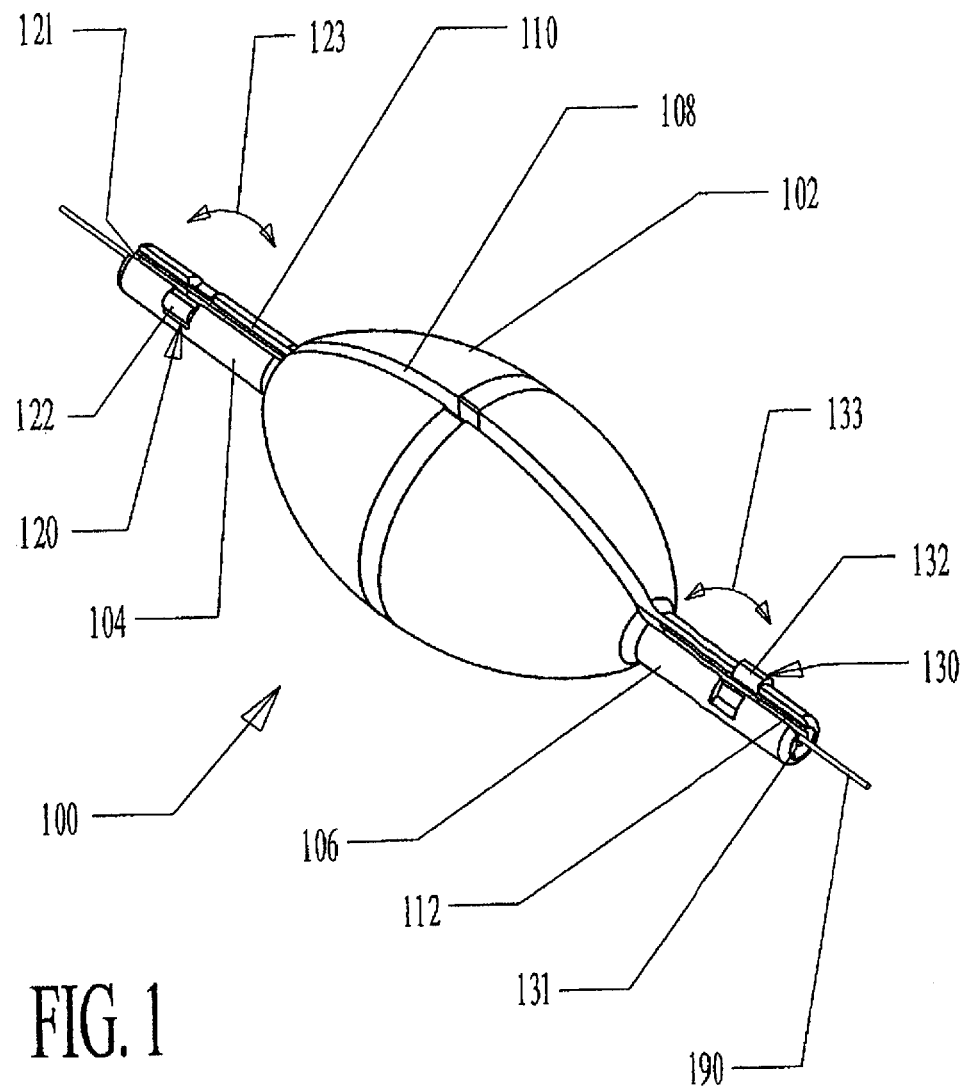
FIG. 1 is a perspective view of a fishing bobber with its closing mechanisms in the open position.

FIG. 1 is a perspective view of bobber 100 having a fishing line 190 running through the bobber. In an embodiment, bobber 100 includes a main body portion 102, a first shaft portion 104, and a second shaft portion 106. Main body portion 102 includes a slot 108 that extends from an outer surface of the main body portion towards the center of the main body portion. First shaft portion 104 includes a slot 110 that extends from the outer surface of the first shaft portion towards the center of the first shaft portion, and second shaft portion 106 includes a slot 112 that extends from the outer surface of the second shaft portion towards the center of the second shaft portion. The main body slot 108, the first shaft slot 110, and the second shaft slot 112 are illustratively aligned such that they form a channel that runs along the entire length of bobber 100. The width of the channel is greater than the width of fishing line 190 such that fishing line 190 is able to be fit within and run through bobber 100.

Bobber 100 also illustratively includes one or more closing mechanisms for connecting bobber 100 to fishing line 190. In the particular example shown in FIG. 1, bobber 100 includes a first closing mechanism 120 and a second closing mechanism 130. Embodiments are not however limited to any particular number of closing mechanisms and may include more or less than the illustrated two (e.g. 0, 1, 3, 4, etc. closing mechanisms). First closing mechanism 120 includes a slot 121 and a tab 122. First closing mechanism 120 is able to rotate within first shaft portion 104 in the directions shown by arrow 123. Second closing mechanism 130 includes a slot 131 and a tab 132. Second closing mechanism 130 is able to rotate within second shaft portion 106 in the directions shown by arrow 133.

In one embodiment, a user rotates first closing mechanism 120 using tab 122 such that the slot 121 of the first closing mechanism is aligned with the slot 110 of the first shaft portion to form an opening. The user is then able to position fishing line 190 within slot 121 of the first closing mechanism 120. The user similarly rotates second closing mechanism 130 using tab 132 such that the slot 131 is aligned with the slot 112 of the second shaft portion to form another opening. The user is then able to position fishing line 190 within slot 131 of the second closing mechanism 130.

Figure 2:
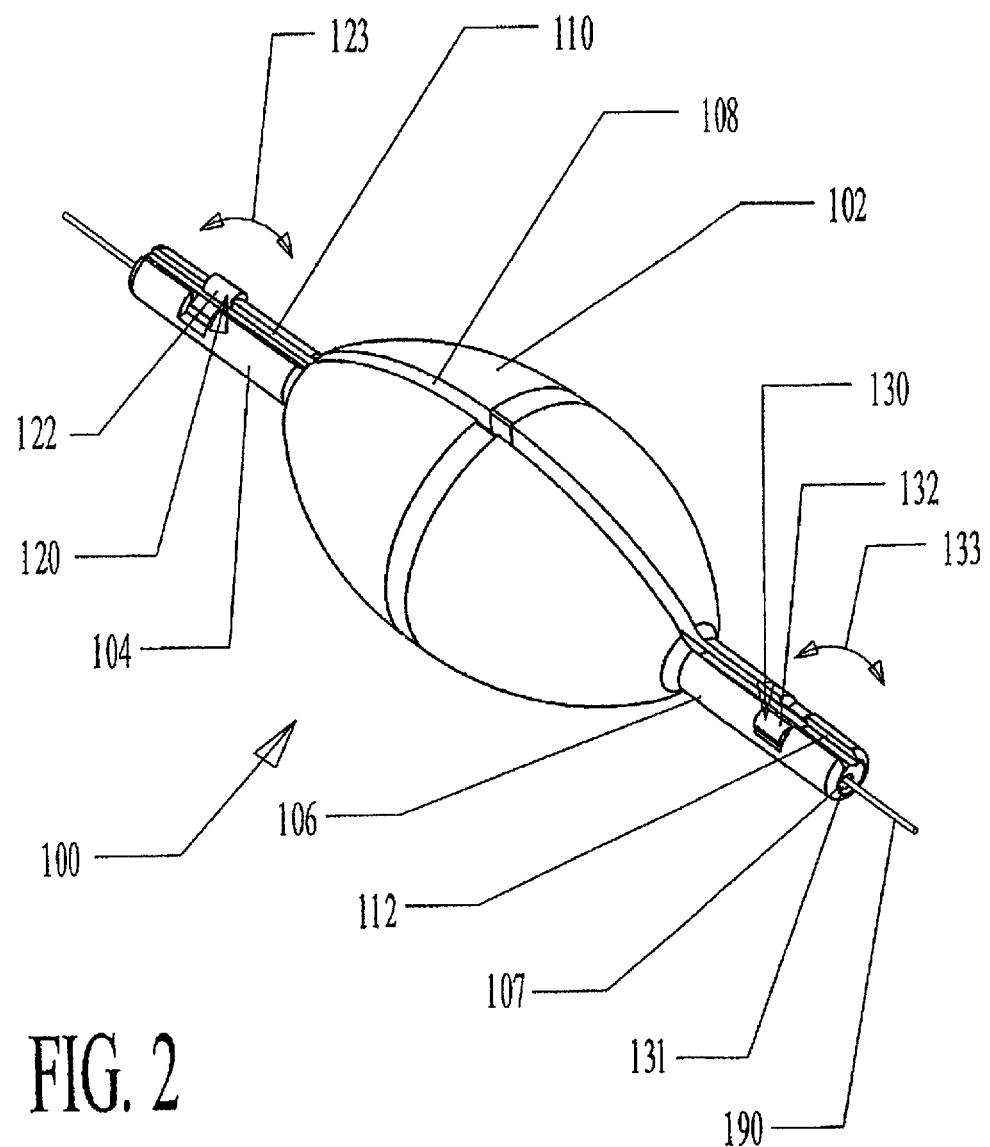
FIG. 2 is a perspective view of a fishing bobber with its closing mechanisms in the closed position.

After fishing line 190 is positioned within the slots of the closing mechanisms and within the main body slot 108, the first closing mechanism 120 and the second closing mechanism 130 are rotated to a closed position to connect bobber 100 to fishing line 190. FIG. 2 shows a perspective view of fishing bobber 100 with closing mechanisms 120 and 130 rotated to their closed positions. In FIG. 2, both the first closing mechanism tab 122 and the second closing mechanism tab 132 have been rotated such that the slots of the closing mechanisms 121 and 131 (shown in FIG. 1) are no longer aligned with the shaft slots 110 and 112 to form openings. As can perhaps be best seen in the bottom right hand corner of FIG. 2, when closing mechanism 130 is rotated into the closed position, fishing line 190 is enclosed within an inner wall 107 of the second shaft portion 106 and the wall of the second closing mechanism slot 131. When first closing mechanism 120 is rotated into the closed position, fishing line 190 is similarly enclosed with an inner wall of the first shaft portion 104 and the wall of the first closing mechanism slot 121. Accordingly, bobber 100 is able to be connected to and released from fishing line 190 by rotating first and second closing mechanisms 120 and 130 into their open and closed positions.

As can be seen in FIG. 2, in one embodiment, fishing line 190 is positioned within the closing mechanisms 120 and 130 such that the fishing line 190 is able to move throughout the length of bobber 100. The surfaces of bobber 100 that may come into contact with fishing line 190 are optionally smooth such that there is a minimal amount of friction between the line 190 and the bobber 100. In such a case, bobber 100 illustratively can be used as a slip bobber. Additionally, as is described in greater detail below, certain embodiments of bobber 100 may also include features that enable the bobber to be used as an attachment bobber as well as a slip bobber.

Figure 3A:
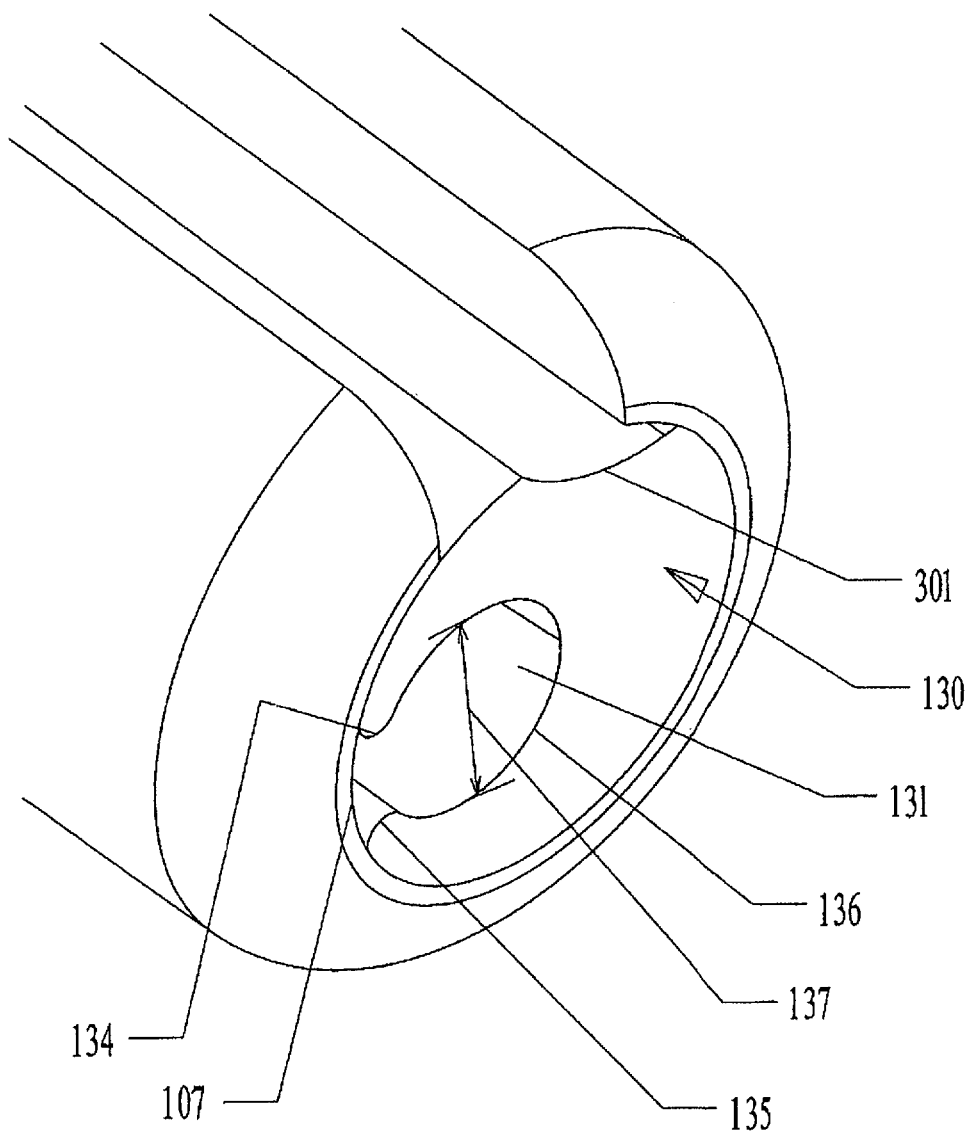
FIG. 3A is a close-up view of a bobber closing mechanism.

FIG. 3A is a close-up view of one illustrative end of a bobber. In the example shown in the figure, closing mechanism 130 includes two different slots that run along the entire length of the closing mechanism. The first slot 131 has a first edge 134, a second edge 135, and a circular wall 136. Circular wall 136 has a diameter 137. In an embodiment, diameter 137 is larger than a diameter of a fishing line to be used with the bobber. Accordingly, when a fishing line is positioned within first slot 131, the bobber is able to freely move along the length of the fishing line and function as a slip bobber. The fishing line is prevented from escaping first slot 131 by an inner wall 107 of the shaft portion FIG. 3A also shows that closing mechanism 130 has a second slot 301. In one embodiment, slot 301 is formed as a shallow groove that runs along the length of the closing mechanism 130. In the example shown in the figure, second slot 301 is formed as one continuous curved surface. Embodiments of second slot 301 are not however limited to any particular configuration and may have a different shape or design.

Figure 3C:
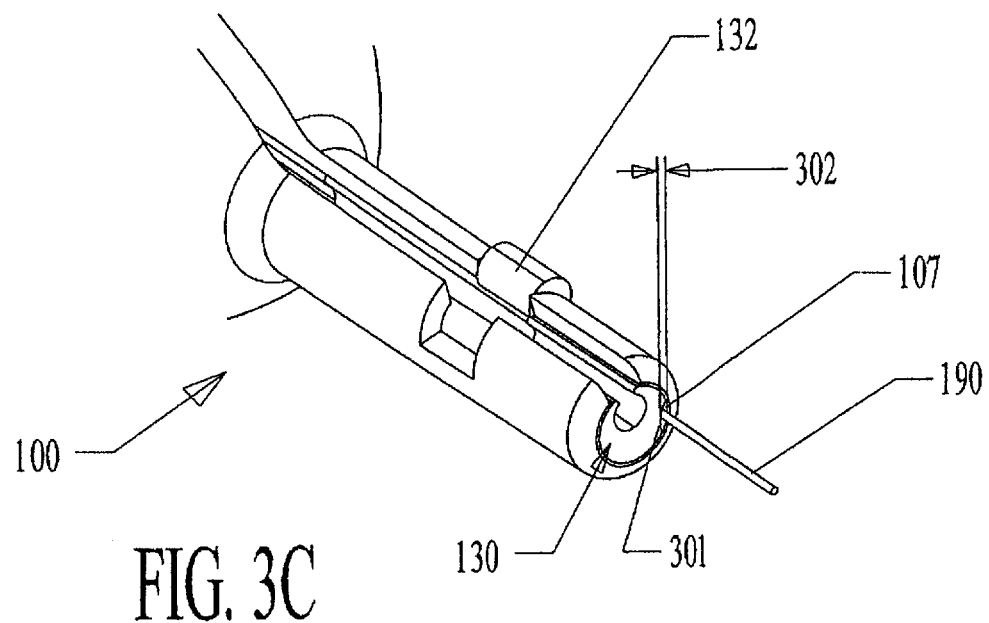
FIG. 3C is a close-up view of a fishing line being enclosed within an "attachment slot" of a bobber.
Figure 3B:
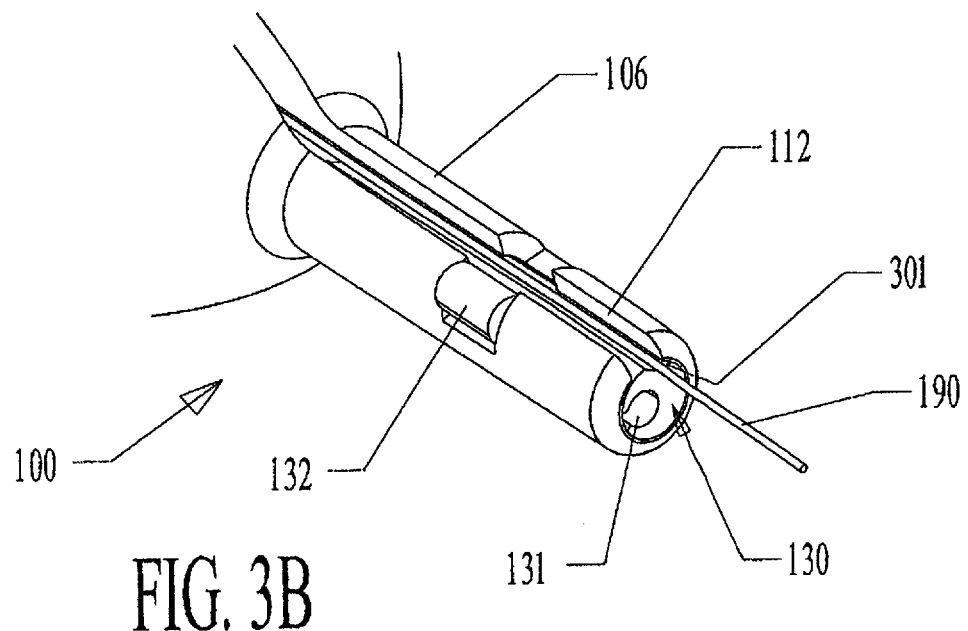
FIG. 3B is a close-up view of a fishing line being placed within an "attachment slot" of a bobber.

FIGS. 3B and 3C show how a fishing line 190 may be connected to fishing bobber 100 utilizing second slot 301. In FIG. 3B, the closing mechanism has been rotated using tab 132 such that the closing mechanism second slot 301 is aligned with the shaft slot 112. This allows for fishing line 190 to be placed within slot 301. In FIG. 3C, the closing mechanism has been rotated using tab 132 such that the closing mechanism second slot 301 is aligned with an inner wall 107 of the shaft portion and not aligned with shaft slot 112. Accordingly, the second slot 310 and the shaft inner wall 107 form an enclosed space that captures fishing line 190.

In an embodiment, second slot 301 has a depth such that the distance 302 between the second slot 301 and the shaft inner wall 107 is less than the diameter/width of fishing line 190. In such an embodiment, fishing line 190 is prevented from moving along the length of second slot 301. Second slot 301 can therefore be used to maintain bobber 100 at a fixed position on fishing line 190. In other words, second slot 301 enables bobber 100 to be used as an attachment bobber.

As can be seen in FIGS. 3A-3C, a closing mechanism 130 may include both a slot 131 that enables a bobber to move along the length of a fishing line (i.e. a "slip slot"), and a slot 301 that enables a bobber to be maintained at a fixed position along the length of a fishing line (i.e. an "attachment slot"). Accordingly, in at least certain embodiments of the present disclosure, one single bobber can function both as a slip bobber and as an attachment bobber depending upon the positioning of the fishing line within the bobber.

Additionally, it should be noted that although FIGS. 3A-3C only show one closing mechanism having two slots (i.e. slots 131 and 301), it should be recognized that each closing mechanism within a bobber (e.g. both closing mechanisms 120 and 130 in FIG. 1) illustratively include two slots. In such an embodiment, a bobber can be used as a slip bobber by enclosing the fishing line within the "slip slots" of each of the closing mechanisms, or the bobber can be used as an attachment bobber by enclosing the fishing line within the "attachment slots" of each of the closing mechanisms. Embodiments of bobbers of the present disclosure are not however limited to any particular design. For instance, bobbers may have only "slip slots," only "attachment slots," or any combination of both "slip slots" and "attachment slots." Also for instance, embodiments of bobbers may have any number of closing mechanisms (e.g. 1, 2, 3, etc.) with any number of slots within each of the closing mechanisms (e.g. 1, 2, 3, etc.).

Figure 4:
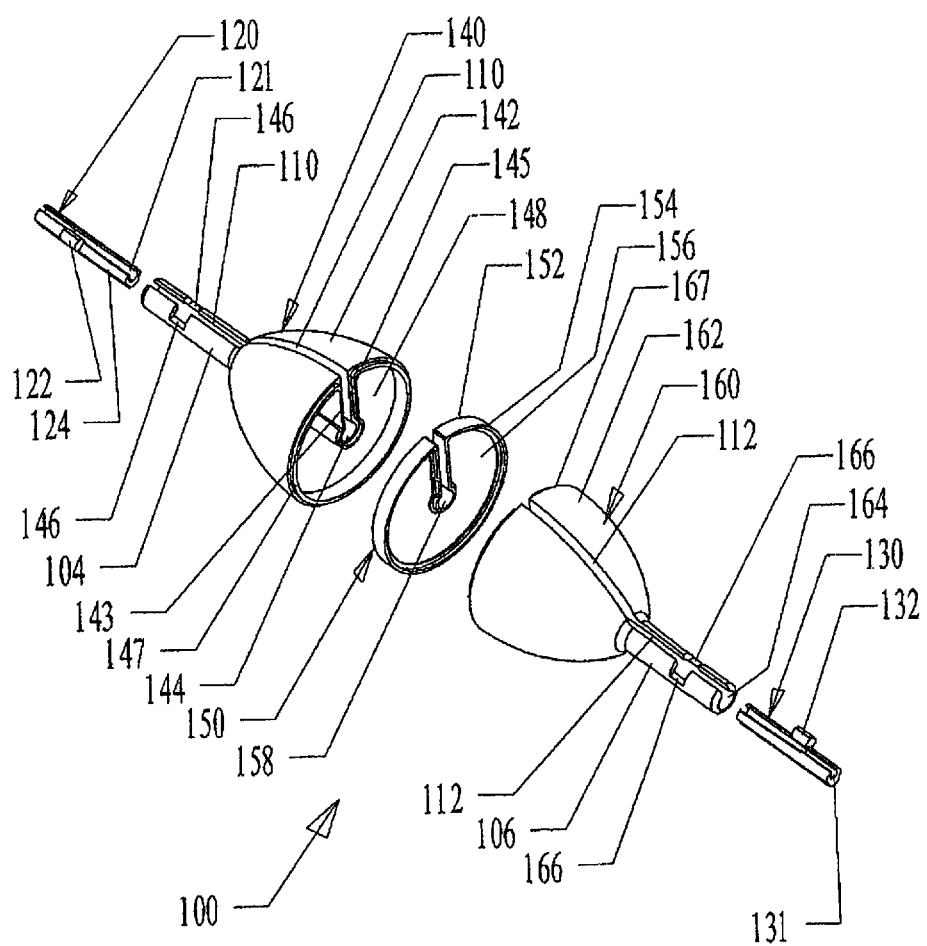
FIG. 4 is an exploded view of a fishing bobber.

FIG. 4 shows an exploded view of bobber 100 with each of the parts of bobber 100 separated from each other. In the embodiment shown in the figure, bobber 100 is made using five pieces. Each of the pieces is optionally made using the same material (e.g. a plastic). However, embodiments of the present disclosure are not limited to any particular construction and may be made using more or less than the illustrated five pieces, and may be made from any material or combination of materials.

Bobber 100 illustratively includes a first closing mechanism 120, a first combined shaft/main body portion 140, a center portion 150, a second combined shaft/main body portion 160, and a second closing mechanism 130. In an embodiment, first and second closing mechanisms 120 and 130 are the same, and first and second combined shaft/main body portions 140 and 160 are the same. This may reduce manufacturing costs by reducing the number of different parts that need to be made. The parts do not however necessarily need to be made to be the same and may be different.

First closing mechanism 120 illustratively includes a tab 122, a generally cylindrical portion 124, and a slot 121. First combined shaft/main body portion 140 illustratively includes a first shaft portion 104, a first main body portion 142, and a central aperture 144 that runs throughout the length of the portion 140. The outer diameter of the closing mechanism generally cylindrical portion 124 is smaller than the diameter of the central aperture 144 such that the first closing mechanism 120 is able to be positioned within the central aperture 144. In particular, first closing mechanism 120 is positioned within shaft portion 104.

First combined shaft/main body portion 140 also illustratively includes a tab channel 146 that runs perpendicular to the slot 110. Tab channel 146 provides space on either side of slot 110 such that tab 122 can be rotated between the open and closed positions. Side walls 143 and 145 run between the central aperture 144 and the outer perimeter of the bobber. Side walls 143 and 145 are illustratively smooth and enable a fishing line to be positioned within and removed from the bobber.

First combined shaft/main body portion 140 optionally includes a ridge 147 that is smaller than a ridge 152 of center portion 150. First combined shaft/main body portion 140 may be connected to center portion 150 by fitting ridge 147 within ridge 152. In an embodiment, first combined shaft/main body portion 140 is hollow such that it has an air space 148. First shaft/main body portion 140 is illustratively connected to center portion 150 such that water cannot or has difficulty entering air space 148. In such a case, air space 148 provides buoyancy to the bobber enabling the bobber to float. In one embodiment, first shaft/main body portion 140 and center portion 150 may be connected using a water resistant adhesive. However, first shaft/main body portion 140 and center portion 150 do not necessarily need to be connected using an adhesive and can be connected by other means (e.g. thermally sealed together, mechanically snap-fit to each other, etc.).

Center portion 150 also illustratively includes a second ridge 154, a cross-sectional member 156, and an aperture 158. In an embodiment, aperture 158 is formed such that it has portions corresponding to the central aperture 144 and sidewalls 143, 145 of the first combined shaft/main body portion 140. Accordingly, aperture 158 allows a fishing line to be positioned within the bobber and optionally run through the bobber (e.g. for the bobber to be used as a slip bobber). Cross-sectional member 156 in at least some embodiments provides mechanical support for the bobber. For example, cross-sectional member 156 may make a bobber more rigid and less compressible. Second ridge 154 is illustratively used to connect second shaft/main body portion 160 to center portion 150. For instance, second shaft/main body portion 160 optionally includes a ridge 167 that is smaller second ridge 154. Second shaft/main body portion 160 can then be connected to center portion 150 by fitting ridge 167 within ridge 154. Second shaft/main body portion 160 may be secured to center portion 150 in the same or similar manner as first shaft/main body portion 150 is secured to center portion 150 (e.g. adhesive or snap-fit). Second shaft/main body portion 160, as well as first shaft main/body portion 140, are not however limited to any particular method of attachment to center portion 150.

In another embodiment, bobber 100 does not include a center portion 150. Instead, first shaft/main body portion 140 is directly connected to second shaft/main body portion 160. Additionally, in yet another embodiment, bobber 100 does not need to include two separate pieces for first shaft/main body portion 140 and second shaft/main body portion 160. Instead, the first shaft/main body portion 140 and second shaft/main body portion 160 are formed as one piece. For instance, a bobber 100 may be constructed from only three pieces such as from two closing mechanisms (e.g. closing mechanisms 120 and 130) and one single combined shaft/main body portion. Embodiments of the present disclosure are not however limited to any particular construction and may be constructed using any of the methods described above or any other methods.

Second shaft/main body portion 160 illustratively includes a second main body portion 162 and a second shaft portion 106. In an embodiment, such as in the one shown in FIG. 4, second shaft/main body portion 160 includes the same or similar components as first shaft/main body portion 140. For instance, FIG. 4 shows that second shaft/main body portion 160 also includes a slot 112, a tab channel 166, and a central aperture 164. Second shaft/main body portion 160 also optionally includes the other parts of first shaft/main body portion 140 such as sidewalls running from the central aperture to the outer perimeter of the bobber and an air space for providing buoyancy.

In one embodiment, second closing mechanism 130 is the same or similar to first closing mechanism 120 and illustratively fits within second shaft/main body portion 160 the same or similar to as how first closing mechanism 120 fits within first shaft/main body portion 140. For instance, in an embodiment, a tab 132 of second closing mechanism 130 fits with a tab channel 166 of the second shaft/main body portion 160, and is used to align a slot 131 of the second closing mechanism 130 with a slot 112 of the second shaft/main body portion 160 to move the second closing mechanism into an open position to receive a fishing line.

Figure 5:
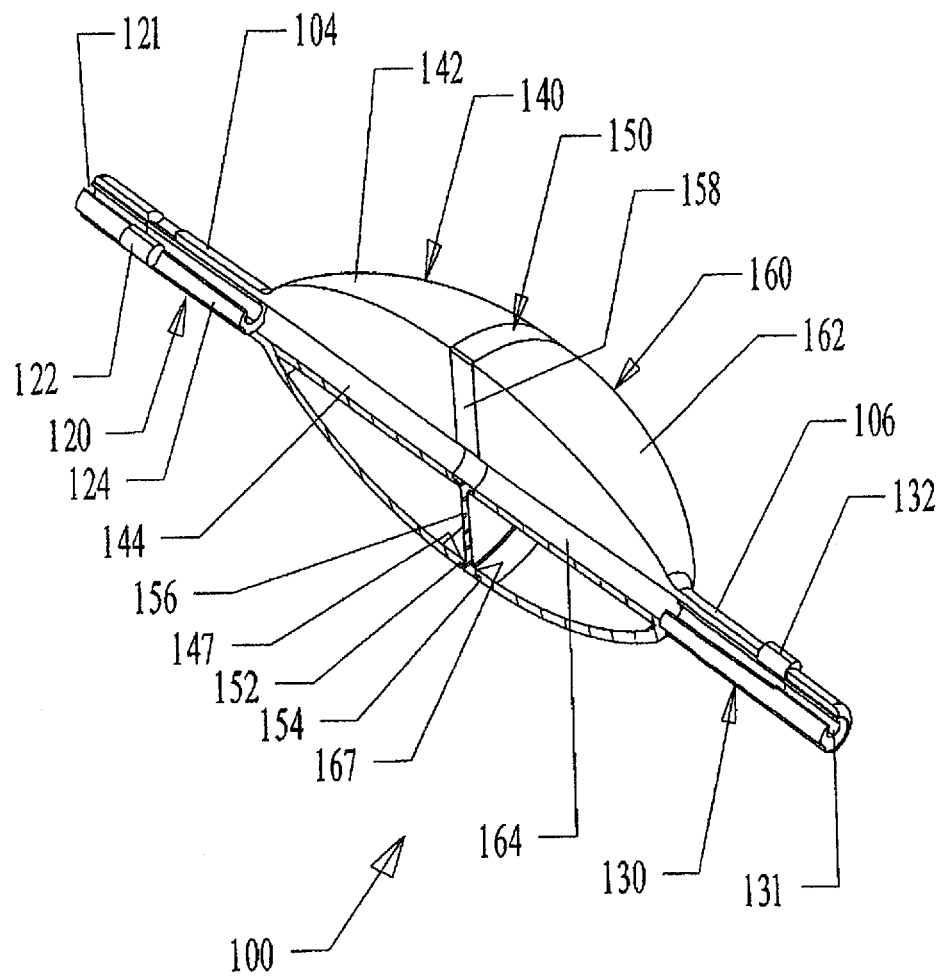
FIG. 5 is a cross-sectional view of a fishing bobber.

FIG. 5 shows a cross-sectional view of the bobber 100. As can be seen in the figure, a slot 121 of first closing mechanism 120, a central aperture 144 of first shaft/main body portion 140, a central aperture 158 of center portion 150, a central aperture 164 of second shaft/main body portion 160, and a slot 131 of second closing mechanism 130 illustratively form one continuous open tubular space that enables a fishing line to be positioned within and run through bobber 100. FIG. 5 also shows how ridge 147 of first shaft/main body portion 140 fits within ridge 152 of center portion 150 to connect the two pieces together in a water resistant manner, and how ridge 167 of second shaft/main body portion 160 fits within ridge 154 of center portion 150 to connect the two pieces together in a water resistant manner. Furthermore, FIG. 5 shows that first shaft portion 104 and first main body portion 142 are formed together as one piece, and that second shaft portion 106 and second main body portion 162 are formed together as one piece.

Figure 6:
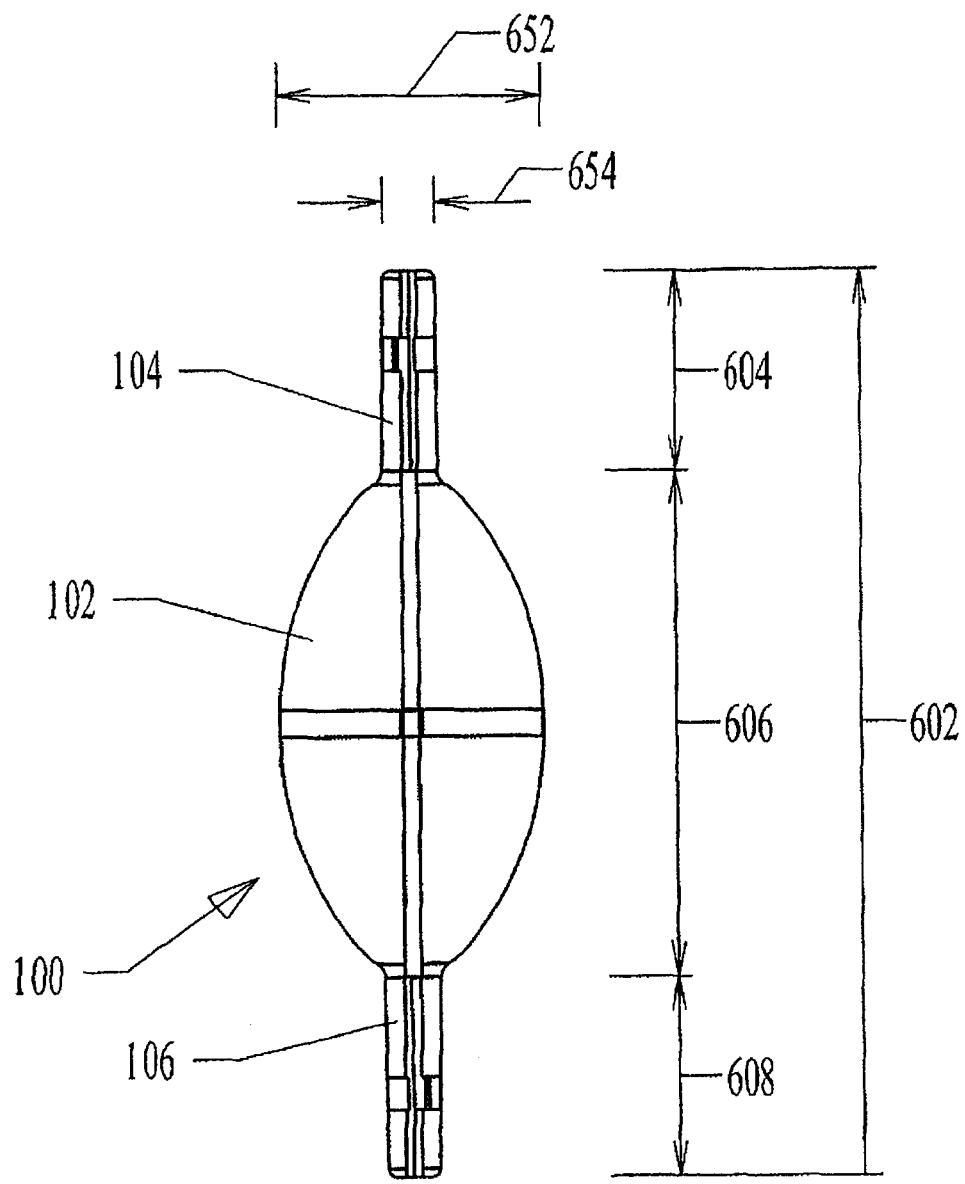
FIG. 6 is a side view of a fishing bobber.

FIG. 6 is a side view of bobber 100. FIG. 6 is useful in showing some of the dimensions of bobber 100. Bobber 100 includes an overall length 602 and a maximum width 652. In an embodiment, overall length 602 is between two and five inches, and maximum width 652 is between half an inch and two inches. Bobber 100 also includes a minimum width 654, a first shaft portion 104 length 604, a main body portion 102 length 606, and a second shaft portion 106 length 608. Minimum width 654 is illustratively between five and thirty percent of the maximum overall width 652. First and second shaft lengths 604 and 608 are each illustratively between five and forty percent of the overall length 602, and the main body portion length 606 is illustratively between forty and ninety percent of the overall length 602. Embodiments of the present disclosure are not however limited to any particular dimensions or ratios, and may include dimensions and ratios outside of those mentioned above.

As can be seen in FIG. 6 and in the other figures, both first shaft portion 104 and second shaft portion 106 have a generally cylindrical shape. The widths 654 of the first and second shaft portions 104, 106 are more or less approximately uniform throughout the lengths 604, 608 of the shaft portions. Additionally, the lengths 604 and 608 of the shaft portions 104, 106 are optionally the same or approximately the same as each other. Main body portion 102 illustratively has a football or oval like shape such that it has a minimal width 654 at its two outer ends and the width increases going towards the center of the main body until the width reaches a maximum width of 652 at the center. Embodiments of the present disclosure are not however limited to any particular shapes or designs, and shapes and designs other than those shown in the figures may be included within embodiments.

Figure 7:
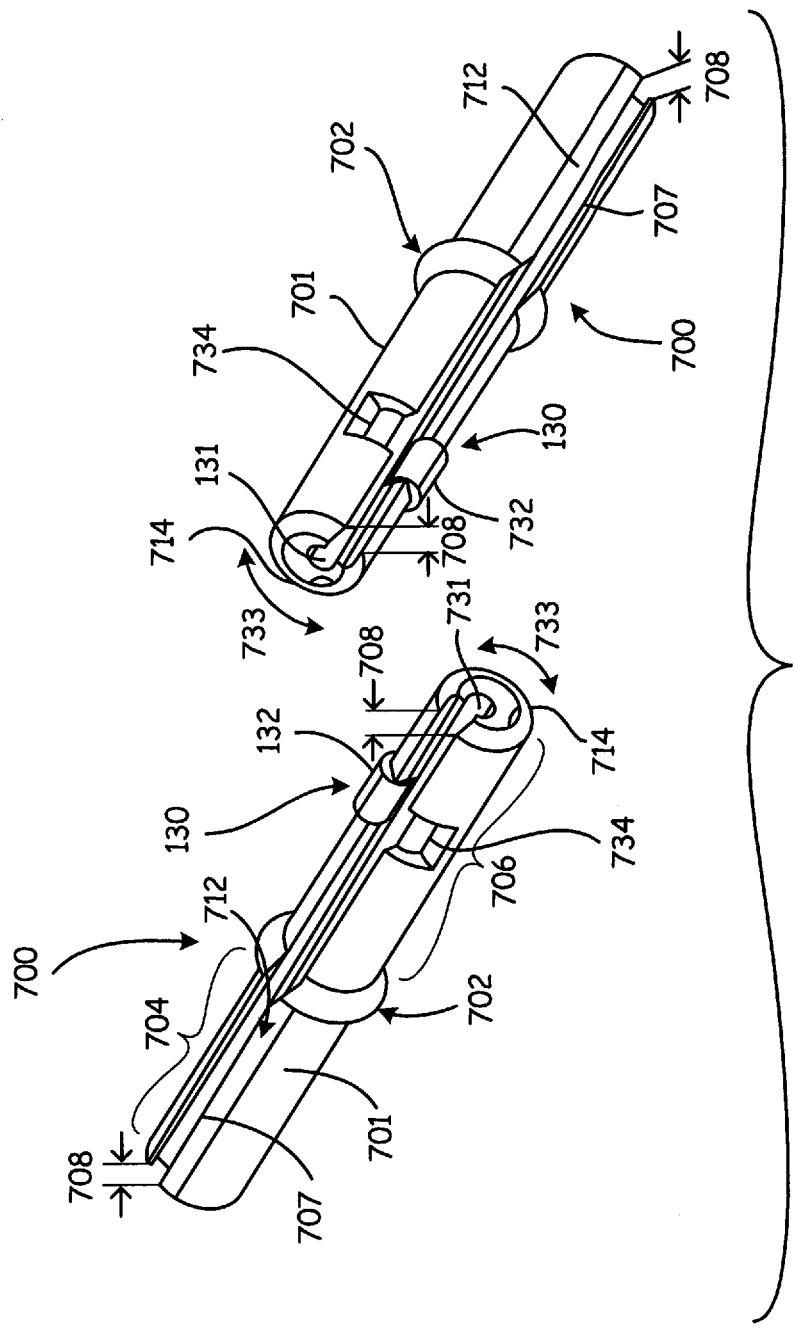
FIG. 7 is a close-up view of a pair of inserts.

FIG. 7 illustrates another embodiment that includes a pair of insert mechanisms 700 separate from the bobber 100. The insert mechanisms 700 are provided for insertion into a fishing device, in order to connect the fishing device to a fishing line 190. Each of the insert mechanisms 700 comprises an elongated outer insert mechanism that is substantially cylindrical, with a channel extending through the center of the insert mechanism that allows a line 190 to extend from one end of the insert mechanism 700 to the other end of the insert mechanism 700. However, as noted in FIG. 7, the insert mechanism 700 also includes, in one embodiment, an opening 708 that extends along the full length of the insert 700 such that the fishing line 190 does not need to be guided through the insert mechanism 700, but can be placed into the insert mechanism 700 through the opening 708. Each of the insert mechanisms 700 also includes, in another embodiment, a stop 702. When each of the insert mechanism 700 is inserted into a fishing device, it is inserted such that a received portion 704 is housed within the fishing device and an exposed portion 706 is outside of the fishing device. The stop 702 allows the insert mechanism 700 to be removeably inserted into the fishing device, but allows for the locking mechanism and tab 132 to remain exposed.

Each insert mechanism 700, in one embodiment, is comparable to the shaft portion 106 of the bobber 100 described with respect to FIGS. 1-6. Each insert mechanism 700 includes an outer shaft 701 with a shaft slot 712 that is comparable to the shaft slot 112 of bobber 100 and an inner wall 707 that may contact the line 190, comparable to the inner wall 107 discussed above. Additionally, each insert mechanism comprises a closing mechanism 730 that is comparable to closing mechanisms 120, 130 discussed previously. As shown in FIG. 7, the closing mechanism 730 is formed separately from the outer shaft 701 of the insert mechanism 700, such that the closing mechanism 730 moves independently from the outer shaft 701. The closing mechanism 730 comprises a slot 731 that runs along the inside of the closing mechanism 730, comparable to slot 131. The closing mechanism 730 also comprises a tab 732, comparable to tab 732 discussed with respect to FIGS. 1-6. When the closing mechanism 730, via tab 732 is rotated along direction 733 indicated in FIG. 7, the opening 708 closes such that a fishing line 190 placed in the closing slot 731 in the opening position cannot be removed in the closing position. However, as the slot 731 is wider than the width of a fishing line 190, the insert mechanism 700, in the closed position, is moveable along a fishing line 190.

The closing mechanism 730 also includes a second slot 714, comparable to slot 301 discussed above with respect to FIGS. 3A-C. The closing mechanism 730 is rotatable using tab 732 such that the slot 714 is aligned with the shaft slot 712, allowing for the fishing line 190 to be placed within slot 714. Then, when the closing mechanism 730 is rotated such that the closing mechanism 730 is aligned with inner wall 707 instead of shaft 712, the slot 714 forms an enclosed space that captures fishing line 190. Further, slot 714, in one embodiment, has a depth such that the distance between the slot 714 and the inner wall 707 is less than the diameter of fishing line 190, preventing the insert from moving along the length of the fishing line 190. This maintains the insert at a specific point on the fishing line 190.

The closing mechanism 730 may also comprise, in another embodiment, a handle channel path 734 that runs perpendicular to the fishing line 190 such that when the tab 732 moves along handle channel path 734 such that, in a first position it makes available opening 708 and, in a second position it makes available second slot 714 and, in another position, neither opening 708 nor slot 714 are available.

Figure 8:
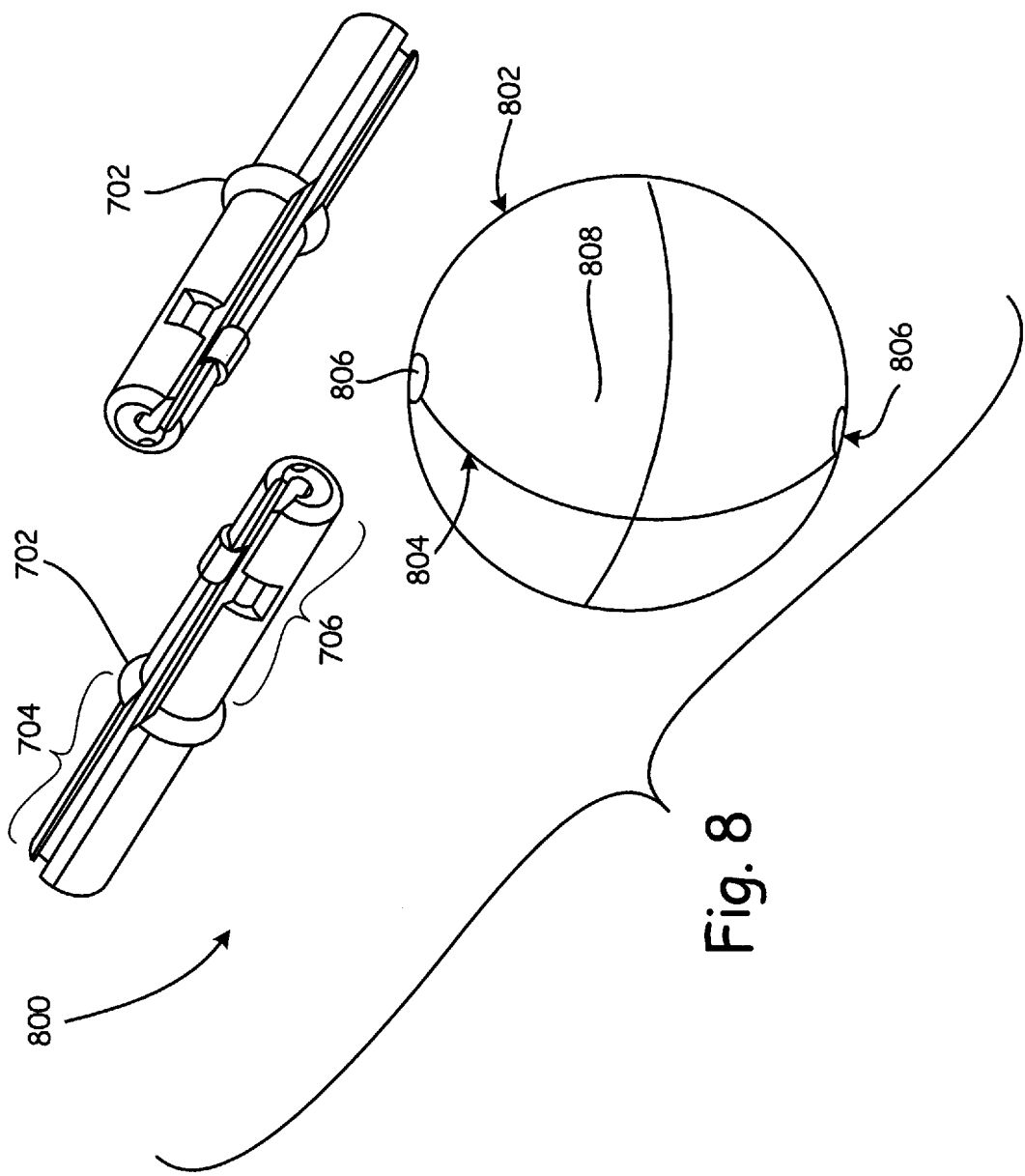
FIG. 8 is a perspective view of a pair of inserts and bobber body.

In another embodiment, shown in FIG. 8, a pair of the insert mechanisms 700 are provided as part of a kit 800 that optionally includes a fishing device 802, wherein the fishing device 802 may be spherical, as shown in FIG. 8, or an ovoid shape, as shown in FIG. 6. However, the fishing device 802 could also be any other appropriate shape. Additionally, the kit could comprise any number of insert mechanisms 700, including a single insert mechanism 700, or more than two insert mechanisms 700. Further, the kit 800 could also include an adhesive or attachment mechanism for fixedly inserting the insert mechanism 700 into the fishing device 802.

The fishing device 802 may, in one embodiment, be a Styrofoam® bobber. In one embodiment, the Styrofoam® bobber may be pre-cut from an edge to the center of the fishing device forming a line channel that runs through the fishing device 802, as shown in FIG. 8, such that a purchaser of the user can insert a fishing line. In one embodiment, the line channel 808 is formed such that, when inserted, fishing line 190 runs in a straight line from a first insert mechanism 700, through the fishing device 802 through the second insert mechanism 700. In another embodiment, the Styrofoam® bobber is not pre-cut and the purchaser of the kit needs to make such a cut that the fishing line extends through a first insert mechanism, through the fishing device 802 and through the second mechanism 700.

The fishing device 802 has, in one embodiment, at least one insert receiving portion 806, which receives an insert mechanism 700. As shown in FIG. 8, the fishing device 802 has, in one embodiment, two insert receiving portions 806 positioned opposite each other on the fishing device 802. However, the insert receiving portions 806 may, in another embodiment, be positioned such that they are not directly opposite each other. Fishing device 802 also includes, in the embodiment shown in FIG. 8, an opening 804 that extends from the first insert receiving portion 806 to the second insert receiving portion 806. The opening 804 may, in a further embodiment, extend to the center of the fishing device 802 such that, when a fishing line is placed into each of the insert mechanisms 700 and into the opening 804 that it lies in a straight line channel through the fishing device 802 along the line channel 808.

After purchasing a kit that includes a fishing device 802, the user, in one embodiment, makes a cut into the bobber to create opening 804 and line channel 808. The user then inserts a first insert mechanism 700 into a first insert receiving portion 806 and a second insert mechanism 700 into a second insert receiving portion 806. The user then configures the first and second insert mechanisms such that either the second slot 714 is available (to create an attachment bobber) or opening 708 is available (to create a slip bobber). The user then inserts a line 190 into the line channel such that it runs through the first insert mechanism 700, the fishing device 802 and the second insert mechanism 700. The user then moves tab 732 along the handle channel path 734 in the first and second insert mechanisms 700 such that neither the second slot 714 nor the opening 708 is available. While this process has been described with two insert mechanisms 700 it is understood by those in the art that only one insert mechanism 700 may be used. For example, if the diameter of the fishing device 802 is less than twice length of the received portion 704, only one insert mechanism would fit within the fishing device 802. Additionally, in another embodiment, the length of the received portion 704 may be such that it extends through the entirety of the fishing device 802. In a further embodiment, the received portion 704 may be wider than the diameter of the fishing device 802, such that it extends through both receiving portions 806.

As has been described above, embodiments of the present disclosure include fishing bobbers. In some embodiments, fishing bobbers include closing mechanisms that enable the bobbers to easily be connected to or removed from a fishing line by rotating the closing mechanisms between open and closed positions. Bobbers may also have "attachment slots" and/or "slip slots" that enable a bobber to be used as either a slip bobber or as an attachment bobber. Additionally, certain embodiments may be less expensive to manufacture by only including a limited number of separate components. For instance, a shaft and a main body are illustratively combined into one component as opposed to using separate components for the shaft and the main body. Embodiments of the present disclosure also include any other feature or combination of features described above or shown in the figures.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A fishing mechanism for selectively attaching a fishing device to a line, the mechanism comprising:
   an elongated outer insert mechanism having a line path channel formed therein, the line path channel extending from one end of the elongated outer insert to its other end;
   a lock insert that is separate from the elongated outer insert mechanism, the lock insert being rotatably received within the line path channel, wherein the lock insert further comprises a closing mechanism rotatably disposed within the first line channel, wherein the lock insert comprises a first slot and a second slot formed therein, the first slot and the second slot extending from one end of the lock insert to another end of the lock insert, wherein the first slot has a first slot diameter that is greater than a diameter of the line, and the second slot has a second slot diameter that is less than a diameter of the line;
   wherein the elongated outer insert mechanism further comprises an elongated opening that extends from said one to said other end, the elongated opening being configured such that the line may be placed through the elongated opening and into the line path channel without having to guide an end of the line through the line path channel from said one end to said other end.

2. The fishing mechanism of claim 1, wherein the lock insert further comprises a second elongated opening that extends from said one end of the lock insert to said other end of the lock insert.

3. The fishing mechanism of claim 2, wherein the second elongated opening is configured such that the line may be placed through the second elongated opening and into the second line path channel without having to guide an end of the line through the second line path channel from said one end of the second line path channel to said other end of the second line path channel.

4. The fishing mechanism of claim 1, wherein the locking mechanism further comprises a tab that, when the lock insert is rotated within the line path channel, the tab is configured to slide along a tab rotation path formed within the elongated outer mechanism.

5. The fishing mechanism of claim 4, wherein said tab is configured to slide along the tab rotation path comprises the tab is configured to slide along the tab rotation path such that the motion of the tab is perpendicular to the longest portion of the elongated outer mechanism.

6. The fishing mechanism of claim 1, wherein the locking mechanism is configured, when rotated into a first position, to allow the line to freely slide through the line path channel and, when rotated into a second position, prevents the line from freely sliding through the line path channel.

7. The fishing mechanism of claim 1, further comprising a stop that is perpendicular to the line path channel, wherein the stop extends perpendicularly along the outer edge of the elongated outer insert mechanism.

8. A fishing mechanism for selectively attaching a fishing device to a line, the mechanism comprising:
   an elongated outer insert mechanism having a line path channel formed therein;
   a locking mechanism slidably received within the elongated outer insert mechanism, wherein the locking mechanism is configured to rotatably slide between a first position and a second position, wherein the first position comprises a free position wherein the fishing device is configured to move along the line with a first slot with a first diameter, and wherein the second position comprises a locked position within a second slot with a second diameter, wherein the fishing device is configured to be fixed at a set position on the line, and wherein the first diameter is greater than a line diameter, and wherein the second diameter is less than a line diameter;
   wherein rotatably sliding comprises rotation with respect to a body of the bobber.

9. The fishing mechanism of claim 8, wherein the line path channel extends from one end of the elongated outer insert mechanism to its other end, and wherein the elongated outer insert mechanism further comprises an elongated opening that extends from said one to said other end, the elongated opening being configured such that the line may be placed through the elongated opening and into the line path channel without having to guide an end of the line through the line path channel from said one end to said other end.

10. The fishing mechanism of claim 8, wherein the lock insert further comprises a second line path channel formed therein, the line path channel extending from one end of the lock insert to another end of the lock insert and wherein the second elongated opening is configured such that the line may be placed through the second elongated opening and into the second line path channel without having to guide an end of the line through the second line path channel from said one end of the second line path channel to said other end of the second line path channel.

11. The fishing mechanism of claim 8, further comprising a stop that is perpendicular to the line path channel, wherein the stop extends perpendicularly along the outer edge of the elongated outer insert mechanism.

12. A kit, the kit comprising:
   a plurality of insert mechanisms, wherein each of the insert mechanisms comprises:
   an elongated outer insert mechanism having a line path channel formed therein;
   a locking mechanism slidably received within the elongated outer insert mechanism, wherein the locking mechanism is configured to rotatably slide between a first position and a second position, wherein sliding between the first position and the second position comprises rotation of the locking mechanism with respect to the elongated outer insert mechanism, wherein the locking mechanism comprises a first slot and a second slot formed therein, the first slot and the second slot extending from one end of the lock insert to another end of the lock insert;
   wherein the first position comprises a free position wherein the insert is moveable along a line inserted in the first slot, wherein the first slot has a first slot diameter that is greater than a line diameter;
   wherein the second position comprises a locked position wherein the fishing device is configured to be fixed at a set position on the line, wherein the second slot has a second slot diameter that is less than the line diameter;

wherein each insert mechanism further comprises a stop that is perpendicular to the line path channel, wherein the stop extends perpendicularly along the outer edge of the elongated outer insert mechanism.

13. The kit of claim 12, wherein the kit also comprises a fishing device configured to be attached to a line, wherein the fishing device comprises:

a line path channel and an elongated opening that extends from a first end of the line path channel to a second end of the line path channel end, the elongated opening being configured such that the line may be placed through the elongated opening and into the line path channel; and wherein the fishing device is configured to receive at least a first and second of the plurality of insert mechanisms such that the line extends through the first insert mechanism to the first end of the line path channel of the fishing device, and further through the second end of the line path channel of the fishing device, and through the second insert mechanism.

14. The kit of claim 13, and further wherein the fishing device is a buoyant fishing device.

15. The kit of claim 14, wherein the buoyant body is ovoid in shape.

16. The kit of claim 14, wherein the buoyant body is substantially spherical.

17. The kit of claim 13, wherein the elongated opening extends from said one to said other end such that the elongated opening extends through a center of the fishing device.

18. The kit of claim 12, and further wherein each of the insert mechanisms is configured to be received within a fishing device such that a portion of the insert mechanism, extending from an end of the insert mechanism to the stop is received by the fishing device.

* * * * *